Feb. 2, 1954  H. E. VAN VALKENBURG  2,667,780
ULTRASONIC INSPECTION DEVICE
Filed July 26, 1951
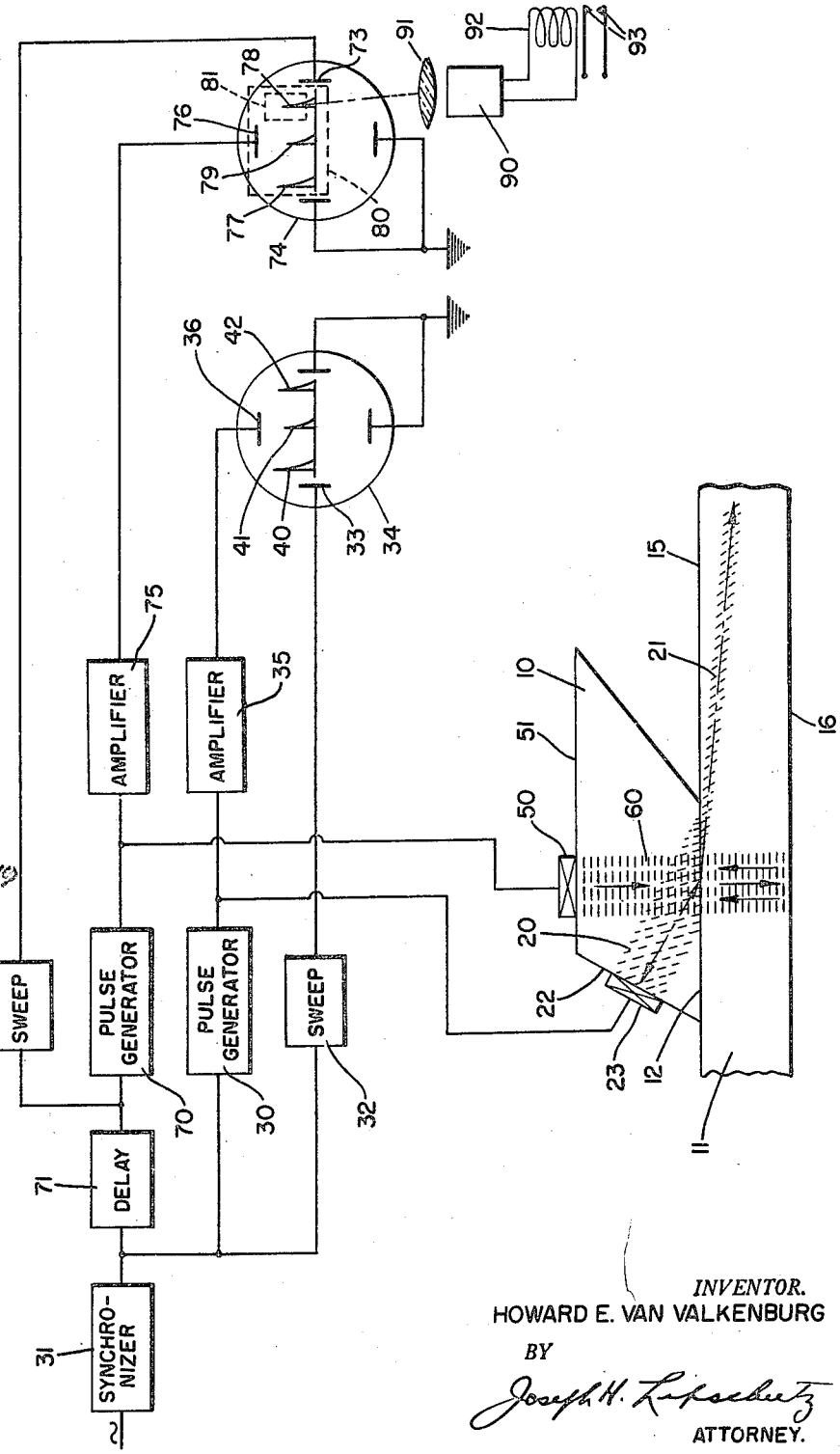
INVENTOR.
HOWARD E. VAN VALKENBURG
BY
Joseph H. Lipschutz
ATTORNEY.

Patented Feb. 2, 1954

2,667,780

UNITED STATES PATENT OFFICE 2,667,780

ULTRASONIC INSPECTION DEVICE

Howard E. Van Valkenburg, Danbury, Conn., assignor to Sperry Products, Inc., Danbury, Conn., a corporation of New York Application July 26, 1951, Serial No. 238,667

1 Claim. (Cl. 73—67)

This invention relates to ultrasonic inspection devices, and particularly to those devices in which ultrasonic beams are transmitted into an object under test at an angle to the entering surface. The test depends upon the beam entering the object, travelling through the object until it strikes a reflecting surface (which may be the end wall of the object or a defect such as a fissure), and being reflected back to the point of transmission. Such testing presupposes good coupling between the search unit which generates the vibrations and the object under test. The mere failure to receive back reflections is not an indication of poor coupling because such failure may be due to other causes such as:

a. There may be no abrupt discontinuity, as in the case of a large round cylinder.
b. The object under test may be too long to permit reception of a reflection within the repetition rate or oscilloscope sweep length, as in the case of a 40-foot rail.
c. The material may be too absorptive to allow the beam to penetrate the entire length of the object.
d. The contour of the object may be a cross-section that results in dispersal of the beam before it can be reflected from the end of the object.

It is therefore very necessary to be able to determine whether the ultrasonic beam is actually entering the object under test, i. e., whether there is good coupling between the search unit and the object to permit effective transmission and reception of the ultrasonic beam.

It is the principal object of this invention to provide means which will give an indication at all times, and practically instantaneously, of the adequacy of the coupling between an ultrasonic search unit and the object under inspection.

Further objects and advantages of the invention will become apparent in the following detailed description thereof.

The accompanying drawing is a wiring diagram in combination with a search unit which is shown in side elevation applied to an object under test.

Referring to the drawing, I have shown a search unit comprising a support 10 applied to an object 11 which is to be internally inspected. For this purpose the support has a surface 12 in engagement with a surface 15 of the object through a suitable couplant. In order that the length of the object may be inspected, an ultrasonic beam is caused to enter the object at an angle so that after refraction it will travel substantially lengthwise of the object as shown at 21. To permit such transmission at any desired angle, the support 10 is provided with an inclined surface 22 upon which a piezo-electric crystal 23 may be mounted. The crystal may be energized from any suitable source of high frequency electric vibrations, such as pulse generator 30, and will transform the electrical oscillations into mechanical oscillations. The pulse generator 30 may be periodically energized by a synchronizer 31 which may be energized from a suitable source such as 60 cycle A. C. The synchronizer may also energize a sweep circuit 32 which controls the sweep between horizontal electrodes 33 of an oscilloscope 34. The crystal 23 may be connected through an amplifier 35 to the vertical plates 36 of the oscilloscope to cause vertical deflection of the sweep in response to signal voltages on crystal 23. The oscilloscope will therefore show the transmitted signal voltage at 40, and any reflections returning to the crystal will generate voltages to cause indications such as 41 and 42 which may be an intermediate defect and the limiting surface of the object, respectively.

However, as stated in the introduction hereto, failure to receive indications 41 and 42 does not in itself indicate loss of coupling since there are many reasons, such as those hereinbefore enumerated, for failure to receive indications. In order that an operator may be kept continuously informed of the state of coupling between search unit and object, I provide a second crystal 50 engaging a surface 51 of support 10. Surface 51 is substantially parallel to surface 15 so that a checking beam 60 will be transmitted into the object substantially normally to surface 15. The crystal 50 is so positioned that beam 60 enters object 15 through substantially the same contact area as beam 20, but beam 60 not being an angle beam and not traversing long distances must necessarily be returned to crystal 50 if the coupling between surface 12 of the support and surface 15 of the object is adequate in the area traversed by beams 20 and 60. Therefore the continuous indication of the reception of the reflected beam 60 would give a continuous indication that beam 20 is adequately coupled to the object.

To achieve the foregoing object, I cause beam 60 to be transmitted repeatedly and alternately with beam 20, with a considerable delay between the transmission of the beam 60 as related to the propagation time of beam 20 through the object. Thus, for example, beam 60 may be started 8,000 microseconds (corresponding to about 160 feet of beam travel in steel) after beam 20 is started. Beam 60 may be generated by energizing crystal 50 from a pulse generator 70. The latter may be energized periodically by synchronizer 31 which energizes pulse generator 30, but a delay mechanism 71 is interposed between the synchronizer and pulse generator 70 to allow the beam 20 to disappear. The synchronizer may energize sweep circuit 72 after the same delay 71, to generate a sweep between the horizontal plates 73 of an oscilloscope 74. The crystal 50 may be connected to the vertical plates 76 through an amplifier 75. The generated pulse will be indicated at 77 and the reflected pulse from back surface 16 of object 11 will be indicated at 78 if the coupling is good. The reflection from the interface formed by surfaces 12 and 15 will be indicated at 79. A screen 80 having an opening 81 may be provided, the screen being so formed as to obscure indications 77 and 79 but show indication 78 if such indication appears. Since the pulse 60 is transmitted at least sixty times a second, indication 78 will appear as a fixed light spot throughout the period of pulse generation provided there is adequate coupling between the search unit and object 11 to permit beam 60 to traverse the interface 12, 15 and be reflected from surface 16. If the coupling is poor, the light spot 78 will disappear. Such disappearance may be caused to actuate any suitable signal or warning system. For example, the light spot 78 may be focussed on light cell 90 by lens system 91 to energize a relay 92 as long as the light spot appears. Should the light spot 78 disappear because of poor coupling, the relay 92 would be de-energized to cause contacts 93 to close and operate a bell or other signal.

Having described my invention, what I claim and desire to secure by Letters Patent is:

A device for ultrasonically inspecting an object, said object having a relatively long dimension and a relatively short dimension, comprising a search unit including a support having a surface adapted to engage the object, said support having a second surface disposed at an angle to normal with respect to said first surface, an electro-acoustic transducer engaging said inclined surface, means for periodically energizing said transducer to produce ultrasonic pulses, said inclined surface being so positioned that said pulses are transmitted into the object in the direction of the long dimension, means for receiving reflections of said pulses, means for indicating the received reflections of said pulses, said support having a third surface, a second electroacoustic transducer engaging said third surface, means for periodically energizing said second transducer to produce pulses alternating with said first pulses, said third surface being positioned so that pulses from said second transducer are transmitted to the said area of the surface of the object and into the object in the direction of the short dimension to test the adequacy of coupling between the search unit and the object, means for receiving reflections of said second pulses, and means for indicating the received reflections of the second pulses, the receipt or non-receipt of reflections of said second pulses indicating adequate or inadequate coupling, respectively.

HOWARD E. VAN VALKENBURG.

References Cited in the file of this patent

UNITED STATES PATENTS

| Number | Name | Date |
|---|---|---|
| 2,527,986 | Carlin | Oct. 31, 1950 |
| 2,592,134 | Firestone | Apr. 8, 1952 |